United States Patent [19]
Sewell et al.

[11] 3,805,517
[45] Apr. 23, 1974

[54] CONTROL SYSTEM FOR GAS TURBINE ENGINES

[75] Inventors: Peter Sewell; John McIntyre, both of Bristol, England

[73] Assignee: The Secretary of State for Defence in Her Majesty's Brittanic Government of the United Kingdom of Great Britain & Northern Ireland, Whitehall, London, England

[22] Filed: Aug. 2, 1971

[21] Appl. No.: 167,931

[30] Foreign Application Priority Data
Aug. 11, 1970 Great Britain.................... 38622/70

[52] U.S. Cl.................. 60/39.09, 60/39.28, 60/223, 60/39.15
[51] Int. Cl............................................. F02g 3/00
[58] Field of Search........... 60/39.28 T, 223, 39.14, 60/39.28 R, 39.09

[56] References Cited
UNITED STATES PATENTS

| | | | |
|---|---|---|---|
| 3,382,671 | 5/1968 | Ehni.................................... | 60/39.14 |
| 3,365,881 | 1/1968 | McKenzie........................ | 60/223 X |
| 3,523,423 | 8/1970 | Young............................ | 60/39.28 R |
| 3,600,887 | 8/1971 | Gault.................................. | 60/39.14 |
| 2,715,815 | 8/1955 | Malick.......................... | 60/39.28 T |
| 2,742,756 | 4/1956 | Boisblanc....................... | 60/39.28 T |
| 3,076,312 | 2/1963 | Haigh............................. | 60/39.28 T |
| 3,623,326 | 11/1971 | Greune.......................... | 60/39.28 T |
| 2,754,658 | 7/1956 | Farkas........................... | 60/39.28 T |

Primary Examiner—Clarence R. Gordon
Attorney, Agent, or Firm—Stevens, Davis, Miller & Mosher

[57] ABSTRACT

A gas turbine engine is provided with an electronic control system for detecting deceleration of the engine above a pre-determined limit, which corresponds to flame out of the engine and for using the signal obtained thereby to initiate a re-lighting procedure.

7 Claims, 3 Drawing Figures

CONTROL SYSTEM FOR GAS TURBINE ENGINES

This invention relates to an electrical control system for gas turbine engines and has for its general object to provide an automatic means for relighting the engine following a "flame-out," i.e. an unintended cessation of combustion.

The consequence of a flame-out are a rapid initial fall in the combustion pressure of the engine and a relatively slower fall in the rotational speed of the engine.

Flame-out may be caused by a fault in the engine or its control system, or by an environmental condition, e.g. ice entering the engine.

The occurrence of a flame-out requires certain actions. Firstly, the fuel flow to the engine must be reduced so as not to supply fuel which cannot be burnt and which, on re-lighting of the engine, would cause explosive combustion conditions. This means for effecting such a fuel reduction must be capable of over-riding the speed governor of the engine, which governor will sense the flame-out in terms of a reduction in speed and will in consequence seek to enlarge the fuel flow.

Secondly, it is necessary to bring into action certain elements of the engine starting procedure. In engines not having a permanently active igniter, it is necessary to switch on the igniter. If the engine relights before there is a significant loss of speed, then no further action is usually necessary. However, if the engine speed falls to a critical speed below which recovery is not ordinarily possible then further elements of the engine starting procedure have to be brought into operation. In aero engines, if a flame-out occurs in flight, the lowest speed to which the engine falls is usually the wind-milling speed, i.e. the speed caused by the flight wind entering the engine air intake.

As far as reduction of fuel in consequence of a flame-out is concerned, it is known to provide an air/fuel ratio (AFR) control system adapted to limit rate of change of speed of the engine. Such a system senses a ratio of fuel and air pressures, and responds by changing the fuel flow in the sense to keep AFR on a predetermined schedule. On occurrence of a flame-out the AFR control senses the diminution in combustion pressure and reduces fuel flow accordingly.

The known flame-out control system is therefore a concomitant of a system for controlling air/fuel ratio in response to certain pressure signals. The object of this invention is to provide a flame-out control system in an engine not having such an AFR control.

According to this invention there is provided an electrical control system for a gas turbine engine comprising a control circuit determining fuel flow to satisfy a demand signal for engine speed, means for generating a signal proportional to rate of change of engine speed, and means responsive to the rate of change signal exceeding a determined value of deceleration for overriding the demand signal in the sense of reducing fuel flow.

Preferably the overriding means respond to a first value of deceleration to effect said reduction in fuel flow and to a second and lower value of deceleration to restore control to said demand signal.

An example of a system according to this invention will now be described with reference to the accompanying drawings wherein.

Figure 1:
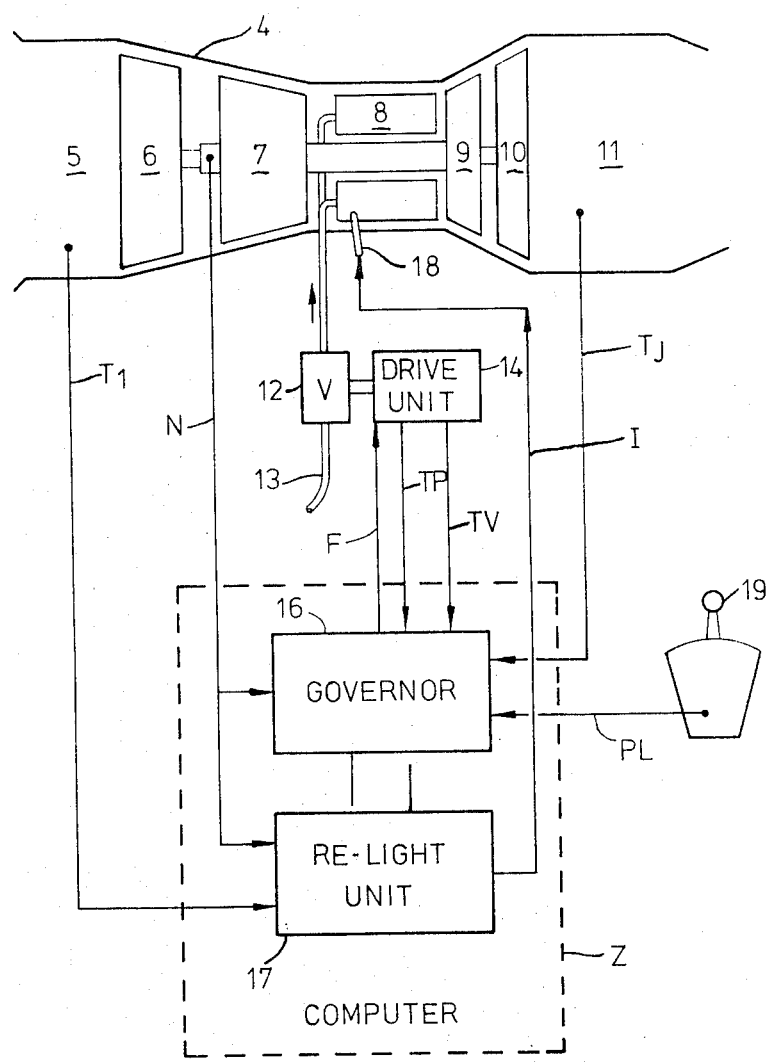
FIG. 1 is a diagrammatic illustration of a gas turbine engine together with the system.

Referring to FIG. 1, there is shown a gas turbine engine 4 comprising in flow-series an air inlet 5, low and high pressure compressors 6, 7, a combustor 8, high and low pressure turbines 9, 10 connected to drive the compressors 6, 7, and a jet pipe 11. Fuel flow to the combustor, and thus the speed of the engine, is regulated by a throttle valve 12 arranged in a fuel supply line 13 and actuated by a drive unit 14. The valve 12 is controlled by a signal F generated by a computer Z in response to a demand signal PL from a pilot's control lever 19. The combustor includes an electric igniter 18 for initiating combustion and operated by a signal I from the computer.

The computer Z includes a fuel governer 16 and a re-light unit 17. During normal running of the engine the governor 16 regulates the fuel flow to satisfy the signal PL, and the igniter 18 is off. The governor also limits the acceleration and deceleration of the engine to avoid respectively surge and stall of the compressors. In the event of a flame-out, the unit 17 over-rides the governor and acts on the signal F to reduce fuel flow so that as the engine speed falls as a consequence of the flame-out, the fuel flow is reduced accordingly. At the same time, the unit 17 establishes the signal I to switch on the igniter 18.

T1 and N are signals representing respectively the compressor inlet temperature and the rotational speed of the high pressure compressor.

Figure 2:
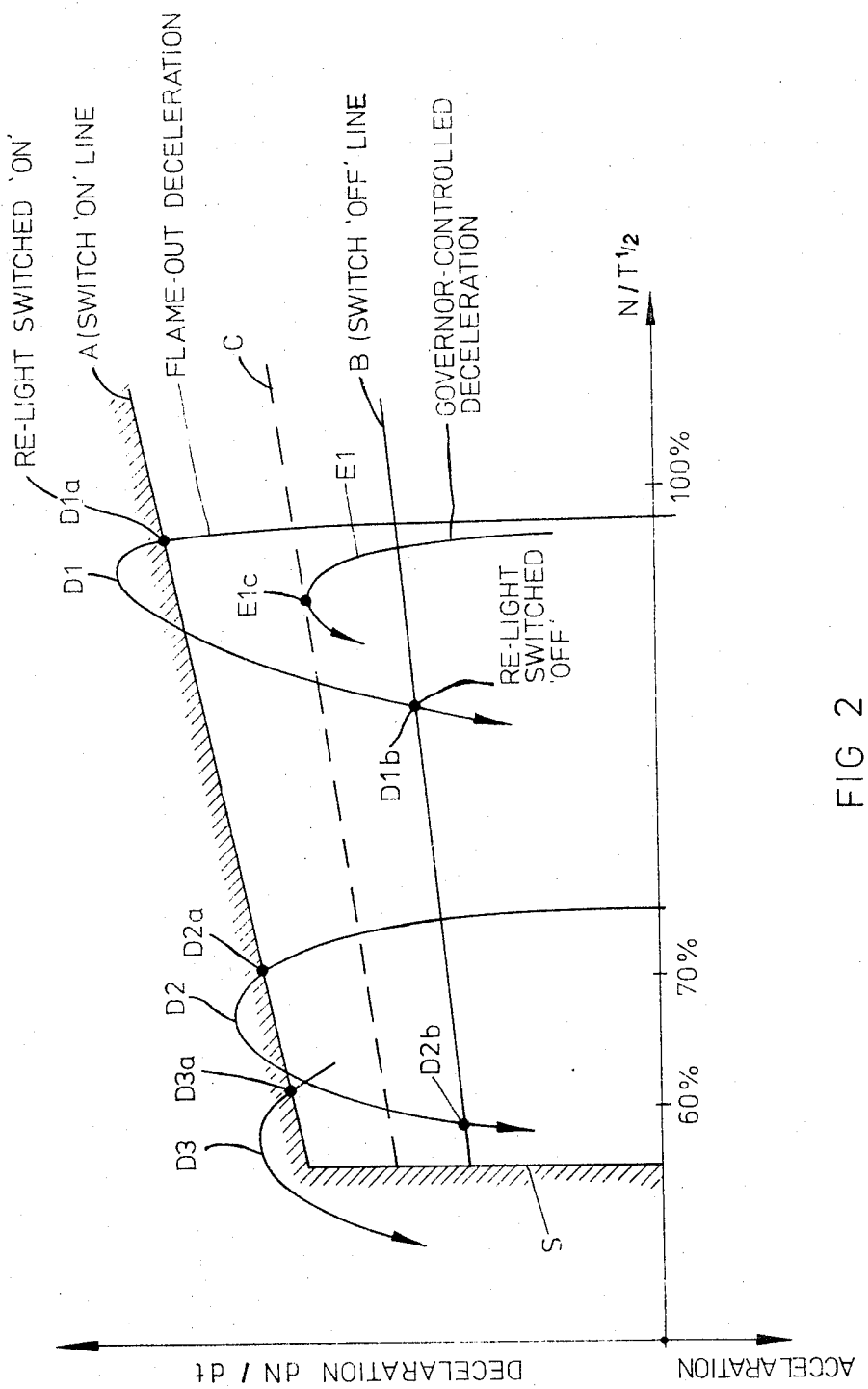
FIG. 2 is a characteristic of parameters concerned in the system.

The fuel flow reduction by the unit 17 is made in response to deceleration as shown in FIG. 2. The line D1 represents a typical flame-out deceleration plotted against non-dimensional speed $N/T^{1/2}$. The re-light unit 17 is tripped, i.e. the fuel flow reduction is initiated and the igniter is switched on, if the deceleration exceeds a trip point D1a. The value of deceleration at D1a is determined by the consideration that it must be above the maximum deceleration allowed by the governor so that the re-light unit is not tripped under normal, i.e. governor controlled, operating conditions of the engine. The maximum deceleration allowed by the governor is typified by a curve E1. Flame-out condition usually produces a deceleration higher than the governor maximum so that there is usually no difficulty in avoiding the range of curves such as E1. However, as will be shown, the governor itself may be adapted to prevent tripping the unit 17 during governed deceleration. The value of flame-out deceleration differs for different engine speeds, the flame-out deceleration being relatively lower if the engine speed at which the flame-out occurred is relatively lower. It is therefore provided that trip points for different engine speeds lie on an operating line A which is inclined as shown, so that, for example, a deceleration D2 has a trip point at D2a. Naturally, the line A should lie as close as possible to a corresponding line C for the maxima of curves such as E1 so that the unit 17 is tripped as soon as possible after deceleration exceeds the line C.

As soon as the engine has re-lit the requirement is of course that the unit 17 is switched off, i.e. that control over fuel flow is returned to the governor and that the igniter is switched off. Since re-lighting is inevitably accompanied by a reduction in deceleration it is logical to switch the unit 17 off if the deceleration falls below a certain value. However, the line A is not itself suitable for this purpose because deceleration might not remain for long enough above the line A to allow a sufficient time for re-lighting. This is so because the deceleration itself declines with the diminution in engine speed and may have declined substantially before the re-lighting has taken place. Thus, for the purpose of switching off the unit 17 there is provided an operating line B which lies significantly closer to the axis of zero deceleration than the line A, points at which the unit 17 is switched off being denoted D1b, D2b as shown on a line B.

If the engine fails to re-light after the line B has been crossed during declining deceleration there will be deceleration towards the speed range at which the engine has to be rotated for normal starting, that is, to a range to the left of a line S. Since it is necessary that at or below starting speed there should be no conflict between the unit 17 and the normal engine starting system (not shown), arrangements are made for the effect of the lines A, B to terminate at the line S. In other words the unit 17 is tripped whenever deceleration is above the line A or to the left of line S.

The means for carrying out the functions described with reference to FIG. 2 will become apparent in the following detailed description of the governor 16 and unit 17 with reference to FIG. 3.

Figure 3:
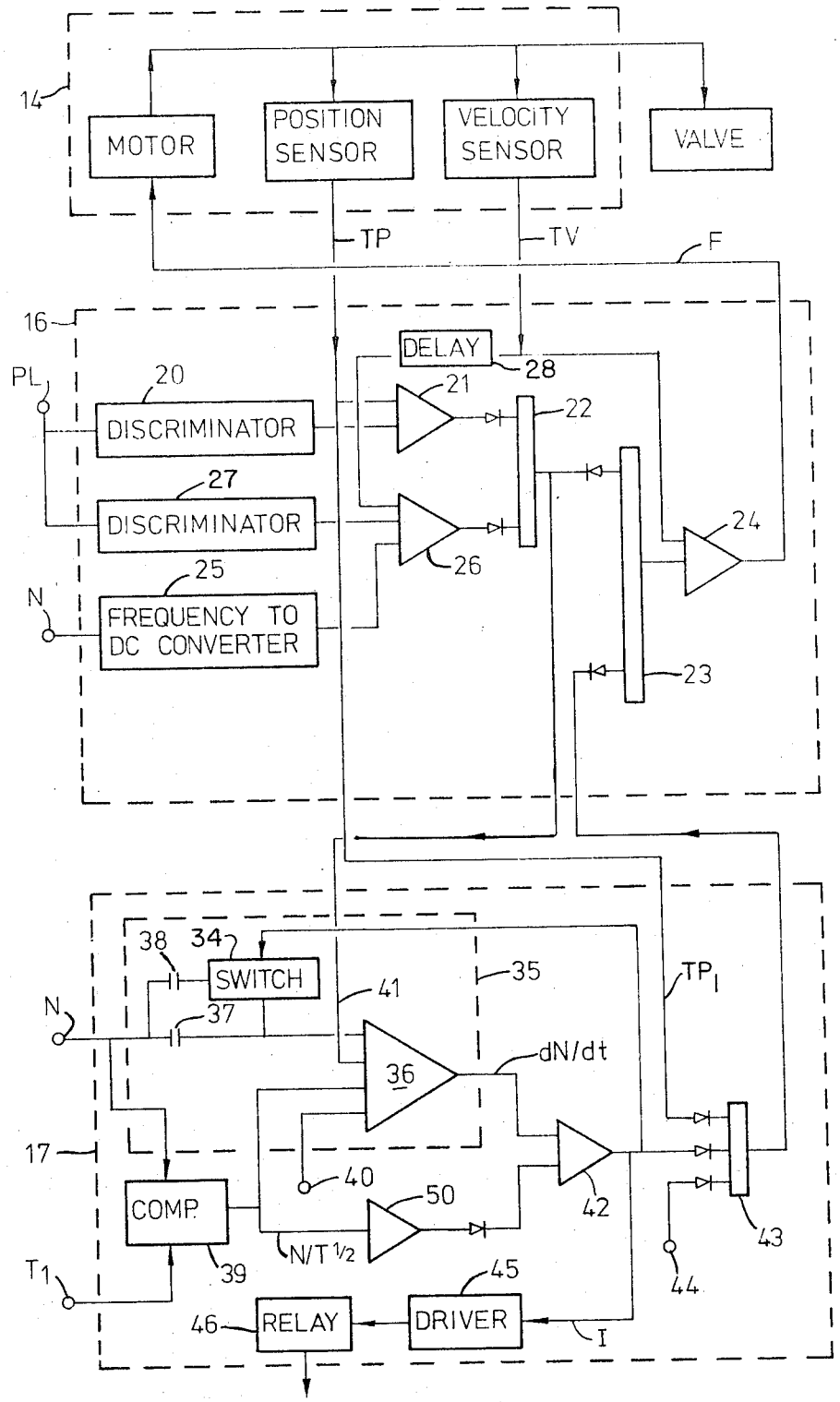
FIG. 3 is a circuit diagram.

Referring to FIG. 3, in the governor 16 the signal PL is fed through a discriminator 20, a summing amplifier 21, a highest win unit 22, a lowest win unit 23, and an output amplifier 24 to emerge as signal F to the throttle drive unit 14, where an electric motor 14A is adapted to provide the opening or closing motion of the valve 12. A valve position signal TP is fed to the amplifier 21 to complete the position control loop. A similar arrangement is made for the speed governor control loop, the signal N being fed through a frequency-to-DC converter 25 into a summing amplifier 26 together with the signal PL as processed by a discriminator 27. The unit 22 allows the higher, i.e. the more positive, of the outputs of the amplifiers 21, 26 to get through to the unit 14, if the signal F is positive the valve opens and vice versa. The velocity of opening or closing of the valve is determined by the magnitude of the signal F and to stabilise the loop a velocity feed back signal TV is fed to the amplifier 24, and through a delay unit 28 to the amplifier 26.

Referring to the flame-out unit 17, the schedules A, B are formed by a differentiator 35 comprising an amplifier 36, a first capacitor 37 cooperating to differentiate the signal N for the purpose of the schedule A, and a second capacitor 38 adapted to be connected in parallel with the capacitor 37 by means of a switch 34, the capacitors 37, 38 cooperating to differentiate the signal N for the purpose of the schedule B. Further, the amplifier 36 has an input N/T produced by a computation unit 39 connected to the signal N and T1. The signal N/T is added into the amplifier 36 to vary the output $dN/dt$ thereof in proportion to the value of N/T to take account of the relatively slower flame-out deceleration at lower engine speeds. A bias signal 40 is added into the amplifier 36 for the purpose of setting the position of the schedule in relation to the steady state datum. A control signal 41 is added into the amplifier 36 with a view to raising the response threshold of the flame-out system. The signal 41 is derived from the output of the unit 22, i.e. the error signal of the fuel control loops, so that the flame-out threshold is raised in case of a throttle closing demand by the pilot. This prevents initiation of the flame-out routine if the pilot should effect a deceleration as high as that at which the flame-out unit would normally respond The signal $dN/dt$ is connected to a switching amplifier or flame-out switch 42 having an output connected through a highest win unit 43 to the lowest win unit 23. The arrangement is such that if the signal $dtN/dt$ rise above the switch datum the switch causes a throttle closing demand to the unit 23. The magnitude of this demand is restricted by a bias signal 44 into the unit 43. The closing of the throttle in consequence of the flame-out action is restricted to the idle position by a branch TP1 of the signal TP into the unit 43, the signal TP being arranged to be zero at the throttle idle position and to become positive when closing beyond the idle position.

The output of the switch 42 is also connected through the line I to a power amplifier 45 to work a relay 46 for switching on the igniter 19.

The signal N/T is also fed through a cut-off amplifier 50 whose output is connected to the switch 42 to cause this switch to remain at the flame-out condition whenever the non-dimensional engine speed is below a certain value, in this case 60 percent of normal cruise speed. This gives the line S in FIG. 2 and ensures that the flame-out condition is maintained if it should happen that the engine speed has fallen to a point when deceleration has ceased.

I claim:

1. A gas turbine engine, comprising:
   a combustion chamber;
   means for supplying fuel to said combustion chamber;
   igniter means disposed in said chamber for igniting fuel contained therein;
   sensing means for sensing a rate of change of the rotational speed of said engine and producing a corresponding deceleration signal; and
   control means interposed between said sensing means and said igniter means for switching said igniter means on to ignite fuel in said chamber when said control means detects a deceleration signal in excess of a predetermined magnitude representing a flame-out condition of said engine.

2. The turbine engine according to claim 1, wherein said control means further comprises means for shutting off said igniter means when the deceleration signal detected by said control means passes below a second predetermined magnitude which is less than the first, flame out, magnitude.

3. The engine according to claim 1, wherein said control means further comprises means for switching on said igniter means when the deceleration signal detected by said control means falls below a further predetermined magnitude corresponding to the starting speed of said engine.

4. The engine according to claim 1, further comprising: switch means for switching the igniter means between the on and off conditions; a valve for controlling fuel supply to the engine; an actuator for positioning the valve; closed loop means for controlling engine speed and including means for producing an engine speed error signal coupled to the actuator to control the valve position; means responsive to said switch means for producing a deceleration control signal when the switch means is operated to switch the igniter on; and means responsive to the deceleration control signal for overriding said error signal to reduce the fuel supply to said engine.

5. The engine according to claim 1, further comprising closed loop means for controlling engine speed, including means for producing an engine speed error signal, and means responsive to the engine speed error signal exceeding a value defining a predetermined rate of reduction in engine speed for rendering said control means incapable of responding to said "switch-on" magnitude of the deceleration signal.

6. A gas turbine engine, comprising: a combustion chamber including an igniter; means for receiving an engine speed signal; means for differentiating the speed signal thereby to produce a signal representing engine deceleration; means responsive to the deceleration signal for switching the igniter on when the deceleration signal exceeds a predetermined "switch-on" magnitude; and means responsive to the deceleration signal for switching the igniter off when the deceleration signal passes below a "switch-off" magnitude defining a lesser deceleration than that defined by the "switch-on" magnitude.

7. The engine according to claim 6, further comprising: closed loop means for controlling engine speed, including means for producing an engine speed error signal, and means responsive to the engine speed error signal exceeding a value defining a predetermined rate of reduction in engine speed for modifying said deceleration responsive means by raising the "switch-on" magnitude.

* * * * *